(12) United States Patent
Hyo

(10) Patent No.: US 9,396,084 B2
(45) Date of Patent: Jul. 19, 2016

(54) DEVICE MANAGEMENT APPARATUS, DEVICE MANAGEMENT SYSTEM, AND DEVICE MANAGEMENT METHOD

(71) Applicant: Kiyohiro Hyo, Tokyo (JP)

(72) Inventor: Kiyohiro Hyo, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 8 days.

(21) Appl. No.: 14/341,666

(22) Filed: Jul. 25, 2014

(65) Prior Publication Data

US 2014/0337541 A1    Nov. 13, 2014

Related U.S. Application Data

(60) Division of application No. 14/281,409, filed on May 19, 2014, now Pat. No. 8,996,752, which is a continuation of application No. 13/667,777, filed on Nov. 2, 2012, now Pat. No. 8,769,161.

(30) Foreign Application Priority Data

Nov. 4, 2011   (JP) ................................ 2011-242744
Sep. 28, 2012  (JP) ................................ 2012-217439

(51) Int. Cl.
*G06F 3/00* (2006.01)
*G06F 11/30* (2006.01)
*H04N 1/00* (2006.01)
*G06Q 10/00* (2012.01)
*H04L 12/26* (2006.01)

(52) U.S. Cl.
CPC ........ *G06F 11/3068* (2013.01); *G06F 11/3048* (2013.01); *G06Q 10/20* (2013.01); *H04L 43/0876* (2013.01); *H04N 1/00344* (2013.01); *H04N 1/00832* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 4,751,484 A * | 6/1988 | Matsumoto et al. | ............ 399/25 |
| 6,761,427 B1 | 7/2004 | Owen et al. | |
| 6,903,836 B2 | 6/2005 | Meade et al. | |
| 7,019,859 B2 | 3/2006 | Phillips et al. | |
| 7,230,730 B2 | 6/2007 | Owen et al. | |

(Continued)

FOREIGN PATENT DOCUMENTS

| | | |
|---|---|---|
| CN | 1713200 A | 12/2005 |
| CN | 101493920 A | 7/2009 |

(Continued)

OTHER PUBLICATIONS www.mashable.com, How the iPad, Is Helping Businesses Go Green, Feb. 17, 2011, pp. 1-7.*

(Continued)

*Primary Examiner* — Henry Tsai
*Assistant Examiner* — Dean Phan
(74) *Attorney, Agent, or Firm* — Oblon, McClelland, Maier & Neustadt, L.L.P.

(57) ABSTRACT

A device management apparatus connected to a plurality of devices via a network includes a collecting unit that receives usage data indicating a status of use of each of the devices from each of the devices and that stores the received usage data in a storage device, and a common data acquiring unit that acquires common data that is common to the devices from the usage data of each of the devices stored in the storage device.

12 Claims, 21 Drawing Sheets

(56) References Cited

U.S. PATENT DOCUMENTS

| | | |
|---|---|---|
| 7,239,413 B2 | 7/2007 | Owen et al. |
| 7,249,269 B1 | 7/2007 | Motoyama |
| 7,315,713 B2 | 1/2008 | Parry et al. |
| 8,024,654 B2 | 9/2011 | Hagiwara |
| 8,090,480 B2 | 1/2012 | Brumfield et al. |
| 8,166,542 B2 | 4/2012 | Uno |
| 8,229,314 B2 | 7/2012 | Shustef |
| 8,249,472 B2 | 8/2012 | Motoyama |
| 8,280,225 B2 | 10/2012 | Kamada et al. |
| 8,406,253 B2 | 3/2013 | Kato et al. |
| 2002/0072998 A1 | 6/2002 | Haines et al. |
| 2004/0100642 A1* | 5/2004 | Nozato ............ 358/1.6 |
| 2005/0071483 A1 | 3/2005 | Motoyama |
| 2006/0036771 A1 | 2/2006 | Yokomura et al. |
| 2006/0064738 A1 | 3/2006 | Hino et al. |
| 2006/0083521 A1 | 4/2006 | Simpson et al. |
| 2006/0221405 A1 | 10/2006 | Matsumoto |
| 2008/0007764 A1 | 1/2008 | Zhang et al. |
| 2008/0065757 A1 | 3/2008 | Motoyama et al. |
| 2008/0106762 A1 | 5/2008 | Mullender et al. |
| 2008/0162952 A1 | 7/2008 | Landers et al. |
| 2009/0063612 A1 | 3/2009 | Hyo |
| 2009/0077654 A1 | 3/2009 | Hong |
| 2010/0002254 A1 | 1/2010 | Hyo |
| 2010/0104309 A1 | 4/2010 | Ferlitsch |
| 2010/0121744 A1 | 5/2010 | Belz et al. |
| 2010/0220352 A1 | 9/2010 | Hyo |
| 2010/0306640 A1 | 12/2010 | Gava et al. |
| 2010/0312600 A1 | 12/2010 | Motoyama |
| 2011/0035335 A1 | 2/2011 | Yamamoto |
| 2011/0067088 A1 | 3/2011 | Hyo |

FOREIGN PATENT DOCUMENTS

| | | |
|---|---|---|
| EP | 1 069 537 A2 | 1/2001 |
| JP | 2003-131763 A | 5/2003 |
| JP | 2004-252780 | 9/2004 |
| JP | 2004-302925 | 10/2004 |
| JP | 2005-108217 | 4/2005 |
| JP | 2006-322761 A | 11/2006 |
| JP | 2008-077649 | 4/2008 |
| JP | 2009-212744 A | 9/2009 |
| JP | 2010-52414 A | 3/2010 |
| JP | 2010-134765 A | 6/2010 |
| JP | 2011-39614 A | 2/2011 |
| JP | 2011-150593 A | 8/2011 |

OTHER PUBLICATIONS

Office Action issued Feb. 24, 2015 in Japanese Patent Application No. 2014-248956.

Office Action issued Feb. 24, 2015 in Japanese Patent Application No. 2014-248959.

Combined Chinese Office Action and Search Report issued Oct. 10, 2014 in Patent Application No. 201210435283.3 (with English language translation).

Office Action issued on Dec. 16, 2014 in the corresponding Japanese Patent Application No. 2012-217439.

Office Action issued on Jan. 6, 2015 in the corresponding Japanese Patent Application No. 2014-248959.

* cited by examiner

FIG.2

| MACHINE TYPE NAME | MACHINE NUMBER | DEPARTMENT NAME |
|---|---|---|
| MFPXX01 | 000001 | DEVELOPMENT |
| MFPXX02 | 000002 | DEVELOPMENT |
| MFPXX03 | 000003 | INTELLECTUAL PROPERTY |
| MFPXX04 | 000004 | PLANNING |
| ⋮ | ⋮ | ⋮ |
| PROJECTOR 1 | 111111 | DEVELOPMENT |
| PROJECTOR 2 | 222222 | DEVELOPMENT |
| PROJECTOR 3 | 111333 | INTELLECTUAL PROPERTY |
| PROJECTOR 4 | 222444 | SALES |
| ⋮ | ⋮ | ⋮ |

| MACHINE TYPE NAME | MACHINE NUMBER | MODEL | INSTALLATION DEPARTMENT NAME | SUBJECT MONTH |
|---|---|---|---|---|
| SUM TOTAL ||||||
| MFPXX01 | 000001 | MODEL XXX | DEVELOPMENT | FEBRUARY 2009 |
| MFPXX02 | 000002 | MODEL XXX | DEVELOPMENT | FEBRUARY 2009 |

152a

| POWER CONSUMPTION AMOUNT (kWh) | | | | | | TOTAL $CO_2$ EMISSION AMOUNT |
|---|---|---|---|---|---|---|
| OPERATING MODE | READY MODE | PANEL OFF | LOW-POWER MODE | SLEEP MODE | TOTAL POWER CONSUMPTION AMOUNT | $CO_2$ EMISSION AMOUNT (kg-$CO_2$) |
| 29.39 | 18.18 | 68.42 | 0.96 | 12.80 | 129.73 | 72.00 |
| 15.40 | 10.29 | 31.64 | 0.52 | 6.56 | 64.41 | 35.75 |
| 13.98 | 7.89 | 36.78 | 0.44 | 6.24 | 65.32 | 36.26 |

| NUMBER OF OUTPUT SHEETS | | $CO_2$ EMISSION AMOUNT (CALCULATED VALUE BASED ON OUTPUT SHEETS) | TOTAL $CO_2$ EMISSION AMOUNT |
|---|---|---|---|
| NUMBER OF OUTPUT PLANES | NUMBER OF OUTPUT SHEETS (CALCULATED VALUE) | $CO_2$ EMISSION AMOUNT (kg-$CO_2$) | $CO_2$ EMISSION AMOUNT (kg-$CO_2$) |
| 330000 | 270000 | 114.31 | 186.32 |
| 160000 | 140000 | 58.84 | 94.59 |
| 170000 | 130000 | 55.47 | 91.73 |

FIG.4

| MACHINE TYPE NAME | MACHINE NUMBER | INSTALLATION DEPARTMENT NAME | SUBJECT MONTH |
|---|---|---|---|
| SUM TOTAL | | | |
| PROJECTOR 1 | 111111 | DEVELOPMENT | JANUARY 2012 |
| PROJECTOR 2 | 222222 | DEVELOPMENT | JANUARY 2012 |

152b

STATUS OF USE OF DEVICE (PRESENT MONTH)

| SUBJECT DAY (DAYS) | OPERATING TIME (HOURS) TOTAL | NORMAL MODE | POWER-SAVING MODE | OPERATING TIME PER DAY (HOURS/DAY) | COMPOSITION RATIO OF OPERATING TIME | POWER-SAVING MODE UTILIZATION RATE | LAMP REPLACEMENTS (NUMBER OF TIMES) |
|---|---|---|---|---|---|---|---|
| - | 350 | 150 | 250 | 12.02 | 100.0% | 71.4% | 0 |
| 32 | 200 | 100 | 150 | 6.25 | 52.0% | 75.0% | 0 |
| 26 | 150 | 50 | 100 | 5.77 | 48.0% | 66.7% | 0 |

| (4) POWER CONSUMPTION AMOUNT (PRESENT MONTH) | | | | (5) $CO_2$ EMISSION AMOUNT (PRESENT MONTH) | | |
|---|---|---|---|---|---|---|
| POWER CONSUMPTION AMOUNT [kWh] | | | POWER REDUCTION AMOUNT IN POWER-SAVING MODE [kWh] | $CO_2$ EMISSION AMOUNT (kg-$CO_2$) | $CO_2$ REDUCTION AMOUNT IN POWER-SAVING MODE (kg-$CO_2$) | REDUCTION EFFECT |
| TOTAL | NORMAL MODE | POWER-SAVING MODE | | | | |
| 98.69 | 42.80 | 55.90 | 15.43 | 55.37 | 8.66 | 13.52% |
| 62.07 | 28.53 | 33.54 | 9.26 | 34.82 | 5.19 | 12.98% |
| 36.62 | 14.27 | 22.36 | 6.17 | 20.55 | 3.46 | 14.42% |

FIG.5

```
CONFERENCE INFORMATION
       INPUT SCREEN

DURATION PER CONFERENCE  : _____ HOURS

AVERAGE NUMBER OF        : _____ PEOPLE
PARTICIPANTS

NUMBER OF SHEETS PER     : _____ SHEETS
DOCUMENT
```

FIG.7

```
START
  ↓
DETERMINE NUMBER OF OUTPUT
SHEETS IN USAGE DATA OF MFP AS    — S31
COMMON DATA
  ↓
CALCULATE TOTAL TIME SPENT FOR
OPERATION OF PROJECTOR            — S32
(PROJECTOR TOTAL TIME)
  ↓
CALCULATE NUMBER OF
CONFERENCES BASED ON DURATION
PER CONFERENCE CONTAINED IN       — S33
CONFERENCE INFORMATION AND
PROJECTOR TOTAL TIME
  ↓
CALCULATE NUMBER OF OUTPUT
SHEETS PER CONFERENCE BASED ON
AVERAGE NUMBER OF PARTICIPANTS
CONTAINED IN CONFERENCE           — S34
INFORMATION AND NUMBER OF
SHEETS PER DOCUMENT
  ↓
CALCULATE NUMBER OF REDUCED
SHEETS OF PROJECTOR AS COMMON     — S35
DATA
  ↓
RETURN
```

FIG.8

| | DURATION PER CONFERENCE | 2 |
|---|---|---|
| CONFERENCE INFORMATION INPUT | AVERAGE NUMBER OF PARTICIPANTS | 6 |
| | NUMBER OF SHEETS PER DOCUMENT | 20 |
| NUMBER OF REDUCED SHEETS (SHEETS) | NUMBER OF OUTPUT SHEETS OF MFP/ PRINTER | 270000 |
| | NUMBER OF REDUCED SHEETS DUE TO USE OF PROJECTOR | 21000 |
| | | |
| SHEET REDUCTION EFFECT | | 7.7% |

FIG.11

(USAGE TABLE OF TV CONFERENCE TERMINAL/MEDIA BOARD)

| MACHINE TYPE NAME | TERMINAL ID | INSTALLATION DEPARTMENT NAME | SUBJECT MONTH |
|---|---|---|---|
| \multicolumn{4}{c}{SUM TOTAL} | | | |
| P3000 | 123456789 | DEVELOPMENT | JANUARY 2012 |
| IW5000 | 987654321 | DEVELOPMENT | JANUARY 2012 |

STATUS OF USE OF DEVICE (PRESENT MONTH)

| SUBJECT DAY (DAYS) | OPERATING TIME (HOURS) | | | OPERATING TIME PER DAY (HOURS/DAY) | COMPOSITION RATIO OF OPERATING TIME | POWER-SAVING MODE UTILIZATION RATE |
|---|---|---|---|---|---|---|
| | TOTAL | NORMAL MODE | POWER-SAVING MODE | | | |
| - | 840 | 800 | 40 | 28.70 | 100.0% | 4.8% |
| 32 | 500 | 500 | 0 | 15.63 | 54.4% | 0.0% |
| 26 | 340 | 300 | 40 | 13.08 | 45.6% | 11.8% |

| POWER CONSUMPTION AMOUNT (PRESENT MONTH) | | | | $CO_2$ EMISSION AMOUNT (PRESENT MONTH) | | |
|---|---|---|---|---|---|---|
| POWER CONSUMPTION AMOUNT [kWh] | | | POWER REDUCTION AMOUNT IN POWER-SAVING MODE [kWh] | $CO_2$ EMISSION AMOUNT (kg-$CO_2$) | $CO_2$ REDUCTION AMOUNT IN POWER-SAVING MODE (kg-$CO_2$) | REDUCTION EFFECT |
| TOTAL | NORMAL MODE | POWER-SAVING MODE | | | | |
| 237.18 | 228.24 | 8.94 | 2.47 | 133.06 | 1.38 | 1.03% |
| 142.65 | 142.65 | 0.00 | 0.00 | 80.03 | 0.00 | 0.00% |
| 94.53 | 85.59 | 8.94 | 2.47 | 53.03 | 1.38 | 2.55% |

FIG.12

(CONFERENCE HISTORY DATA)

| TERMINAL ID: 123456789 | | TERMINAL LOCATION: TOKYO | | | | |
|---|---|---|---|---|---|---|
| PARTICIPATION DATE/TIME | EXIT DATE/TIME | OPERATING TIME | NUMBER OF PARTICIPANTS | LOCATION OF OTHER PARTY | NUMBER OF LOCATIONS | DESTINATION ID |
| 07/04/2012 06:31:43 AM | 07/04/2012 06:32:12 AM | 0:00:29 | 3 | SHINYOKOHAMA | 2 | 987654321 |
| 07/04/2012 06:33:23 AM | 07/04/2012 06:53:53 AM | 0:20:30 | 2 | SHINYOKOHAMA | 2 | 987654322 |
| 07/04/2012 07:06:10 AM | 07/04/2012 08:18:24 AM | 1:12:14 | 1 | OSAKA | 2 | 918273645 |
| 07/05/2012 02:04:55 AM | 07/05/2012 02:27:18 AM | 0:22:23 | 2 | NAGOYA | 2 | 192837465 |
| 07/10/2012 05:10:49 AM | 07/10/2012 06:05:35 AM | 0:54:46 | 3 | NEW JERSEY | 2 | 546372819 |
| 07/12/2012 02:05:48 AM | 07/12/2012 02:25:49 AM | 0:20:01 | 4 | SHINYOKOHAMA | 2 | 987654322 |

FIG.13

```
CONFERENCE INFORMATION INPUT SCREEN

NUMBER OF SHEETS      : _____ SHEETS
PER DOCUMENT
```

FIG. 14A
(CONFERENCE HISTORY DATA)

| TERMINAL ID: 123456789 | | TERMINAL LOCATION: TOKYO | | | | |
|---|---|---|---|---|---|---|
| PARTICIPATION DATE/TIME | EXIT DATE/TIME | OPERATING TIME | NUMBER OF PARTICIPANTS | LOCATION OF OTHER PARTY | NUMBER OF LOCATIONS | DESTINATION ID |
| 07/04/2012 06:31:43 AM | 07/04/2012 06:32:12 AM | 0:00:29 | 3 | SHINYOKOHAMA | 2 | 987654321 |
| 07/04/2012 06:33:23 AM | 07/04/2012 06:53:53 AM | 0:20:30 | 2 | SHINYOKOHAMA | 2 | 987654322 |
| 07/04/2012 07:06:10 AM | 07/04/2012 08:18:24 AM | 1:12:14 | 1 | OSAKA | 2 | 918273645 |
| 07/05/2012 02:04:55 AM | 07/05/2012 02:27:18 AM | 0:22:23 | 2 | NAGOYA | 2 | 192837465 |
| 07/10/2012 05:10:49 AM | 07/10/2012 06:05:35 AM | 0:54:46 | 3 | NEW JERSEY | 2 | 546372819 |
| 07/12/2012 02:05:48 AM | 07/12/2012 02:25:49 AM | 0:20:01 | 4 | SHINYOKOHAMA | 2 | 987654322 |

1301

FIG. 14B
(CONFERENCE HISTORY DATA)

| TERMINAL ID: 987654321 | | TERMINAL LOCATION: SHINYOKOHAMA | | | | |
|---|---|---|---|---|---|---|
| PARTICIPATION DATE/TIME | EXIT DATE/TIME | OPERATING TIME | NUMBER OF PARTICIPANTS | LOCATION OF OTHER PARTY | NUMBER OF LOCATIONS | DESTINATION ID |
| 07/04/2012 06:31:43 AM | 07/04/2012 06:32:12 AM | 0:00:29 | 1 | TOKYO | 2 | 123456789 |
| 07/04/2012 06:33:23 AM | 07/04/2012 06:53:53 AM | 0:20:30 | 1 | TOKYO | 2 | 123456789 |
| 07/13/2012 08:10:00 AM | 07/13/2012 09:00:00 AM | 0:50:00 | 2 | NEW JERSEY | 2 | 546372819 |
| 07/12/2012 02:05:48 AM | 07/12/2012 02:25:49 AM | 0:20:01 | 2 | TOKYO | 2 | 123456789 |

1302

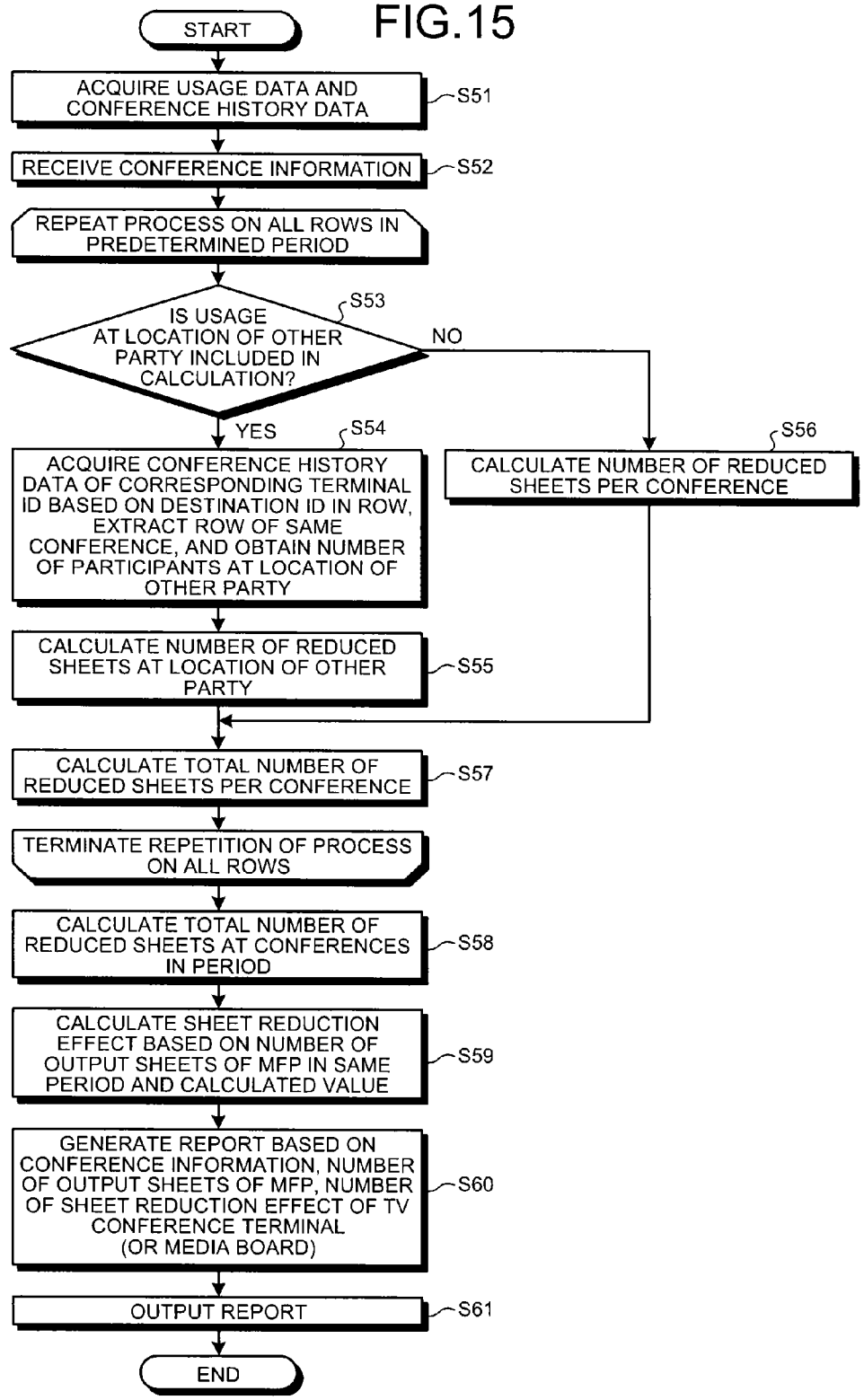

FIG.17

(INTER-LOCATION COST DATA)

| LOCATION A | LOCATION B | COST (YEN) |
|---|---|---|
| TOKYO | SHINYOKOHAMA | 400 |
| TOKYO | OSAKA | 13000 |
| TOKYO | NAGOYA | 7000 |
| TOKYO | NEW JERSEY | 200000 |
| SHINYOKOHAMA | OSAKA | 12500 |
| SHINYOKOHAMA | NAGOYA | |
| ⋮ | ⋮ | ⋮ |

FIG.18A (CONFERENCE HISTORY DATA)

| TERMINAL ID: 123456789 | | TERMINAL LOCATION: TOKYO | | | | |
|---|---|---|---|---|---|---|
| PARTICIPATION DATE/TIME | EXIT DATE/TIME | OPERATING TIME | NUMBER OF PARTICIPANTS | LOCATION OF OTHER PARTY | NUMBER OF LOCATIONS | DESTINATION ID |
| 07/04/2012 06:31:43 AM | 07/04/2012 06:32:12 AM | 0:00:29 | 3 | SHINYOKOHAMA | 2 | 987654321 |
| 07/04/2012 06:33:23 AM | 07/04/2012 06:53:53 AM | 0:20:30 | 2 | SHINYOKOHAMA | 2 | 987654322 |
| 07/04/2012 07:06:10 AM | 07/04/2012 08:18:24 AM | 1:12:14 | 1 | OSAKA | 2 | 918273645 |
| 07/05/2012 02:04:55 AM | 07/05/2012 02:27:18 AM | 0:22:23 | 2 | NAGOYA | 2 | 192837465 |
| 07/10/2012 05:10:49 AM | 07/10/2012 06:05:35 AM | 0:54:46 | 3 | NEW JERSEY | 2 | 546372819 |
| 07/12/2012 02:05:48 AM | 07/12/2012 02:25:49 AM | 0:20:01 | 4 | SHINYOKOHAMA | 2 | 987654322 |

1701

FIG.18B (CONFERENCE HISTORY DATA)

| TERMINAL ID: 987654321 | | TERMINAL LOCATION: SHINYOKOHAMA | | | | |
|---|---|---|---|---|---|---|
| PARTICIPATION DATE/TIME | EXIT DATE/TIME | OPERATING TIME | NUMBER OF PARTICIPANTS | LOCATION OF OTHER PARTY | NUMBER OF LOCATIONS | DESTINATION ID |
| 07/04/2012 06:31:43 AM | 07/04/2012 06:32:12 AM | 0:00:29 | 1 | TOKYO | 2 | 123456789 |
| 07/04/2012 06:33:23 AM | 07/04/2012 06:53:53 AM | 0:20:30 | 1 | TOKYO | 2 | 123456789 |
| 07/13/2012 08:10:00 AM | 07/13/2012 09:00:00 AM | 0:50:00 | 2 | NEW JERSEY | 2 | 546372819 |
| 07/12/2012 02:05:48 AM | 07/12/2012 02:25:49 AM | 0:20:01 | 2 | TOKYO | 2 | 123456789 |

SAMPLE REPORT

COST REDUCTION EFFECT: TOKYO

| COST REDUCTION EFFECT (YEN) | 304500 |
|---|---|

| NUMBER OF TERMINALS | 10 |
|---|---|
| NUMBER OF CONFERENCES | 28 |

DETAILED DATA

| TERMINAL ID | COST REDUCTION EFFECT (YEN) |
|---:|---:|
| 123456789 | 23000 |
| 987654321 | 3000 |
| 192837465 | 5000 |

| CONFERENCE | |
|---|---:|
| 07/04/2012 06:31:43 AM | 23000 |
| 07/04/2012 06:33:23 AM | 3000 |
| 07/12/2012 02:05:48 AM | 5000 |

FIG.21A (USAGE TABLE OF TV CONFERENCE TERMINAL/MEDIA BOARD)

| MACHINE TYPE NAME | TERMINAL ID | INSTALLATION DEPARTMENT NAME | SUBJECT MONTH | SUBJECT DAY (DAYS) |
|---|---|---|---|---|
| SUM TOTAL | | | | - |
| P3000 | 123456789 | DEVELOPMENT | JANUARY 2012 | 32 |
| IW5000 | 987654321 | DEVELOPMENT | JANUARY 2012 | 26 |

| STATUS OF USE OF DEVICE (PRESENT MONTH) | | | | | |
|---|---|---|---|---|---|
| OPERATING TIME (HOURS) | | | OPERATING TIME PER DAY (HOURS/DAY) | COMPOSITION RATIO OF OPERATING TIME | POWER-SAVING MODE UTILIZATION RATE |
| TOTAL | NORMAL MODE | POWER-SAVING MODE | | | |
| 840 | 800 | 40 | 28.70 | 100.0% | 4.8% |
| 500 | 500 | 0 | 15.63 | 54.4% | 0.0% |
| 340 | 300 | 40 | 13.08 | 45.6% | 11.8% |

| POWER CONSUMPTION AMOUNT (PRESENT MONTH) | | | | $CO_2$ EMISSION AMOUNT (PRESENT MONTH) | | |
|---|---|---|---|---|---|---|
| POWER CONSUMPTION AMOUNT [kWh] | | | POWER REDUCTION AMOUNT IN POWER-SAVING MODE [kWh] | $CO_2$ EMISSION AMOUNT (kg-$CO_2$) | $CO_2$ REDUCTION AMOUNT IN POWER-SAVING MODE (kg-$CO_2$) | REDUCTION EFFECT |
| TOTAL | NORMAL MODE | POWER-SAVING MODE | | | | |
| 237.18 | 228.24 | 8.94 | 2.47 | 133.06 | 1.38 | 1.03% |
| 142.65 | 142.65 | 0.00 | 0.00 | 80.03 | 0.00 | 0.00% |
| 94.53 | 85.59 | 8.94 | 2.47 | 53.03 | 1.38 | 2.55% |

COMPARISON      COMPARISON

FIG.21B (PROJECTOR)

| MACHINE TYPE NAME | MACHINE NUMBER | INSTALLATION DEPARTMENT NAME | SUBJECT MONTH | SUBJECT DAY (DAYS) |
|---|---|---|---|---|
| SUM TOTAL | | | | - |
| PJ1 | 111111 | DEVELOPMENT | JANUARY 2012 | 32 |
| PJ1 | 222222 | DEVELOPMENT | JANUARY 2012 | 26 |

| STATUS OF USE OF DEVICE (PRESENT MONTH) | | | | | | |
|---|---|---|---|---|---|---|
| OPERATING TIME (HOURS) | | | OPERATING TIME PER DAY (HOURS/DAY) | COMPOSITION RATIO OF OPERATING TIME | POWER-SAVING MODE UTILIZATION RATE | LAMP REPLACE-MENTS |
| TOTAL | NORMAL MODE | POWER-SAVING MODE | | | | |
| 350 | 150 | 250 | 12.02 | 100.0% | 71.4% | 0 |
| 200 | 100 | 150 | 6.25 | 52.0% | 75.0% | 0 |
| 150 | 50 | 100 | 5.77 | 48.0% | 66.7% | 0 |

COMPARISON          COMPARISON

| POWER CONSUMPTION AMOUNT (PRESENT MONTH) | | | | $CO_2$ EMISSION AMOUNT (PRESENT MONTH) | | |
|---|---|---|---|---|---|---|
| POWER CONSUMPTION AMOUNT [kWh] | | | POWER REDUCTION AMOUNT IN POWER-SAVING MODE [kWh] | $CO_2$ EMISSION AMOUNT (kg-$CO_2$) | $CO_2$ REDUCTION AMOUNT IN POWER-SAVING MODE (kg-$CO_2$) | REDUC-TION EFFECT |
| TOTAL | NORMAL MODE | POWER-SAVING MODE | | | | |
| 98.69 | 42.80 | 55.90 | 15.43 | 55.37 | 8.66 | 13.52% |
| 62.07 | 28.53 | 33.54 | 9.26 | 34.82 | 5.19 | 12.98% |
| 36.62 | 14.27 | 22.26 | 6.17 | 20.55 | 3.46 | 14.42% |

DEVICE MANAGEMENT APPARATUS, DEVICE MANAGEMENT SYSTEM, AND DEVICE MANAGEMENT METHOD

CROSS-REFERENCE TO RELATED APPLICATIONS

The present application is a division of U.S. patent application Ser. No. 14/281,409 filed May 19, 2014, which is a continuation of U.S. patent application Ser. No. 13/667,777 filed on Nov. 2, 2012 (now U.S. Pat. No. 8,769,161), which claims priority to Japanese Patent Application No. 2011-242744 filed in Japan on Nov. 4, 2011 and Japanese Patent Application No. 2012-217439 filed in Japan on Sep. 28, 2012. The entire contents of each of the above are incorporated by reference herein.

BACKGROUND OF THE INVENTION

1. Field of the Invention

The present invention relates to a device management apparatus, a device management system, and a device management method.

2. Description of the Related Art

Conventionally, services that monitor information on devices, such as image forming apparatuses, on a network and issue reports of monitoring results have been provided by various service providers or the like.

For example, Japanese Patent Application Laid-open No. 2005-108217 discloses a technology, in which, to access a monitored device among devices communicably connected to a network, at least one communication protocol supported by the device is used to access an external information storage unit to thereby acquire information for access to the device, the information for access to the device acquired from the external storage unit is stored in an internal storage table, a communication protocol is selected from a plurality of communication protocols, and the access to the device is enabled by using the selected communication protocol and the information stored in the internal storage table.

Furthermore, Japanese Patent Application Laid-open No. 2008-77649 discloses a method for acquiring information concerning a monitored device on a HTTP-based network in order to acquire a uniform vendor name and/or product model name when different vendor names and/or product model names are present.

However, in the conventional technologies, while information is acquired from various devices in an office, the information is only accumulated and reported. Therefore, there is a demand to acquire information from different types of devices and provide various services based on a combination of the acquired information and the like.

Therefore, there is a need to provide a device management apparatus, a device management system, and a device management method capable of acquiring the status of use from a plurality of devices and providing various services.

SUMMARY OF THE INVENTION

It is an object of the present invention to at least partially solve the problems in the conventional technology.

A device management apparatus connected to a plurality of devices via a network, the device management apparatus comprising: a collecting unit configured to receive usage data indicating a status of use of each of the devices from each of the devices and store the received usage data in a storage device; and a common data acquiring unit configured to obtain common data that is common to the devices from the usage data of each of the devices stored in the storage device.

A device management system comprising: a plurality of devices; and a device management apparatus connected to the devices via a network, wherein each of the devices transmits usage data indicating a status of use of each of the devices to the device management apparatus.

And the device management apparatus includes: a collecting unit configured to receive the usage data from each of the devices and store the received usage data in a storage device; and a common data acquiring unit configured to obtain common data that is common to the devices from the usage data of each of the devices stored in the storage device.

A device management method executed by a device management system that includes a plurality of devices and a device management apparatus connected to the devices via a network.

And the device management method comprising: transmitting, by each of the devices, usage data indicating a status of use of each of the devices to the device management apparatus; receiving, by the device management apparatus, the usage data from each of the devices; storing, by the device management apparatus, the usage data received from each of the devices; and obtaining, by the device management apparatus, common data that is common to the devices from the usage data of each of the devices stored in the storage device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram for explaining an example of a device management DB;

FIG. 3 is a diagram for explaining an example of usage data of a multifunction peripheral, and is segmentalized and each segment parts are placed up and down because of its wideness;

FIG. 4 is a diagram for explaining an example of usage data of a projector, and is segmentalized and each segment parts are placed up and down because of its wideness;

FIG. 5 is a diagram for explaining an example of a conference information input screen according to the first embodiment;

FIG. 7 is a flowchart illustrating the flow of a common data conversion process;

FIG. 8 is a diagram for explaining an example of conference information, the number of reduced sheets, and a sheet reduction effect according to the first embodiment;

FIG. 11 illustrates an example of usage data of each of a TV conference terminal and a media board, and is segmentalized and each segment parts are placed up and down because of its wideness;

FIG. 12 illustrates an example of conference history data according to the second embodiment;

FIG. 13 is a diagram for explaining an example of a conference information input screen according to the second embodiment;

FIGS. 14A and 14B are diagrams for explaining calculation of common data of a TV conference terminal or a media board as the other party;

FIG. 15 is a flowchart illustrating the flow of a device management process according to the second embodiment;

FIG. 17 illustrates an example of inter-location cost data;

FIGS. 18A and 18B are diagrams for explaining calculation of a cost reduction effect according to a third embodiment;

FIG. 20 is a diagram for explaining a display example of a generated report according to the third embodiment; and FIGS. 21A and 21B illustrate an example of usage data according to a modification in diagram forms, each diagram is segmentalized and each segment parts are placed up and down because of its wideness, and each FIGS. 21A and 21B need to be cross-referred.

DETAILED DESCRIPTION OF THE PREFERRED EMBODIMENTS

Exemplary embodiments of the present invention will be explained in detail below with reference to the accompanying drawings.

First Embodiment

Figure 1:
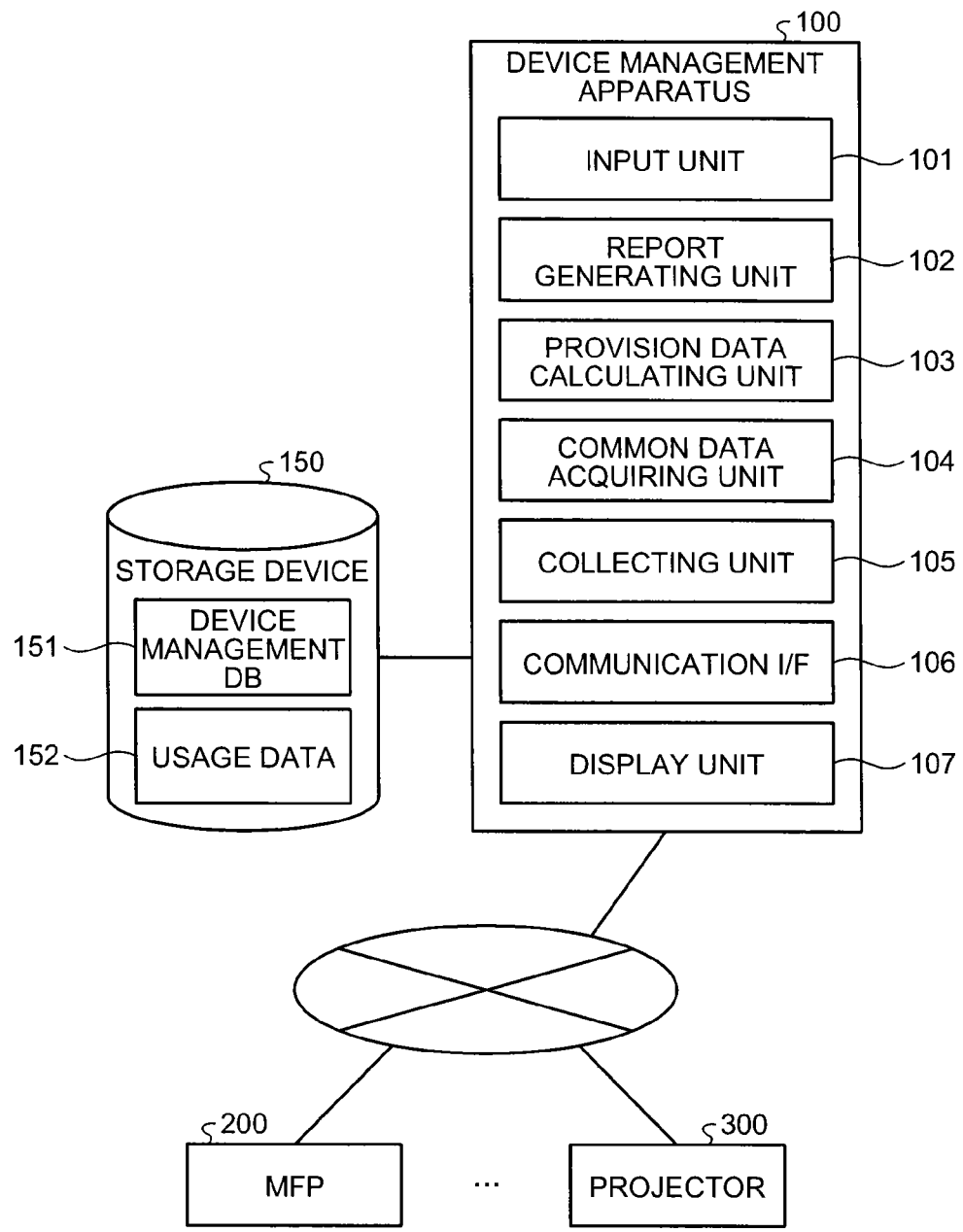
FIG. 1 is a block diagram illustrating a network configuration of a device management system and a functional configuration of a device management apparatus according to a first embodiment.

FIG. 1 is a block diagram illustrating a network configuration of a device management system and a functional configuration of a device management apparatus according to a first embodiment. The device management system according to the first embodiment includes, as illustrated in FIG. 1, a plurality of devices, such as a multifunction peripheral (MFP) 200 and a projector 300, and a device management apparatus 100, all of which are connected to a network, such as the Internet or a local area network (LAN). In the first embodiment, the devices connected to the device management apparatus 100 include devices of different types, such as the MFP 200 and the projector 300.

The MFP 200 is an image forming apparatus equipped with at least any two of a copy function, a printer function, a scanner function, and a facsimile function. In the first embodiment, the MFP 200 is equipped with at least a printer function. The projector 300 is an image display device that projects an image.

In the first embodiment, the MFP 200 and the projector 300 are described as examples of the devices; however, the present invention is not limited thereto. For example, an image forming apparatus, such as a copier, a scanner, a printer, or a facsimile machine, other than an MFP, or other information equipments (e.g., a personal computer, a mobile terminal, such as a smartphone, or a video conference system) may be included as the devices.

Each of the devices including the MFP 200 and the projector 300 transmits usage data indicating a status of use of each of the devices to the device management apparatus 100 at predetermined times. Examples of the predetermined times include, but not limited to, times at regular intervals (e.g., for every day, for every week, or for every month), times when a request is received from the device management apparatus 100, times when a power is turned on, times when a conference is held, and times when a predetermined operation is performed.

The device management apparatus 100 is an information processing apparatus that manages a plurality of devices connected to the network. As illustrated in FIG. 1, the device management apparatus 100 mainly includes an input unit 101, a display unit 107, a report generating unit 102, a provision data calculating unit 103, a common data acquiring unit 104, a collecting unit 105, a communication interface 106 (hereinafter, described as the "communication I/F 106").

The device management apparatus 100 is connected to a storage device 150. The storage device 150 is a storage medium, such as a hard disk drive device (HDD) or a memory. The storage device 150 may be configured as a part of the device management apparatus 100 or may be configured as a device separate from the device management apparatus 100. The storage device 150 stores therein a device management database 151 (hereinafter, described as the "the device management DB 151") and usage data 152.

The device management DB 151 is a database for managing the devices connected to the network. FIG. 2 is a diagram for explaining an example of the device management DB 151. As illustrated in FIG. 2, in the device management DB 151, a machine type name of each device, a machine number, and a department name to which each device belongs are registered in an associated manner. The department name is referred to when usage data or the like is added up for each department.

Referring back to FIG. 1, the usage data 152 is data indicating a status of use of each device and is received from each device. The usage data 152 contains information that differs for each device. FIG. 3 is a diagram for explaining an example of usage data 152a of the MFP 200. And FIG. 3 is segmentalized and each segment parts are placed up and down because of its wideness. As illustrated in FIG. 3, in the usage data 152a of the MFP 200, management items including a machine type name, a machine number, a model, an installation department, a subject month, etc. and other items including a power consumption amount, a $CO_2$ emission amount, the number of output sheets, etc. are registered. Here, the number of output sheets is an item specific to the MFP 200.

FIG. 4 is a diagram for explaining an example of usage data 152b of the projector 300. And FIG. 4 is also segmentalized and each segment parts are placed up and down because of its wideness. As illustrated in FIG. 4, in the usage data 152b of the projector 300, management items including a machine type name, a machine number, a model, an installation department, a subject month, etc. and other items including an operating time, a power consumption amount, a $CO_2$ emission amount, a $CO_2$ reduction amount, etc. are registered. In the first embodiment, the operating time and the $CO_2$ reduction amount are items specific to the projector 300. In this way, the usage data of each device contains a specific item indicating the status of use of each device. In the case of devices other than the MFP and the projector, for example, a communication time may be used for a mobile terminal or a video conference system and an operating time may be used for a personal computer.

Referring back to FIG. 1, the communication I/F 106 is a communication device, such as a network board. The display unit 107 is a display device, such as a display.

The collecting unit 105 receives and collects the above-described usage data 152 from each of the devices including the MFP 200 and the projector 300 via the communication I/F 106 and stores the collected usage data 152 in the storage device 150.

The input unit 101 receives, as data (second data) on a use environment of a device used by a user, input of conference information on a conference from the user. In the first embodiment, duration per conference, an average number of participants in a conference, and the number of sheets per document are used as the conference information; however, the present invention is not limited thereto.

In the first embodiment, the device management apparatus 100 displays a conference information input screen on the display unit 107, causes the user to input the conference information via the conference information input screen, and causes the input unit 101 to receive the input conference information.

FIG. 5 is a diagram for explaining an example of the conference information input screen according to the first embodiment. As illustrated in FIG. 5, the duration per conference, the average number of participants in a conference, and the number of sheets per document can be input as the conference information via the conference information input screen.

Referring back to FIG. 1, the common data acquiring unit 104 obtains common data that is common to a plurality of devices from the pieces of the usage data of the respective devices stored in the storage device 150.

In the first embodiment, the number of output sheets (corresponding to first data) contained in the usage data of the MFP 200 serving as a specific device among the devices is used as the common data. Therefore, the common data acquiring unit 104 determines the number of output sheets in the usage data 152a of the MFP 200 as the common data to thereby obtain the common data. The common data acquiring unit 104 converts the usage data of each of the devices other than the MFP 200 into the number of output sheets based on the conference information to thereby obtain the common data. Namely, the converted values serve as the common data. In the first embodiment, the operating time (a total time etc.) contained in the usage data 152b of the projector 300 is converted into the number of output sheets (the common data), and the converted value is used as the common data. In the first embodiment, the number of output sheets as the common data converted from the operating time is referred to as the number of reduced sheets.

Therefore, it is sufficient that the usage data 152a of the MFP 200 contains at least the number of output sheets and the usage data 152b of the projector 300 contains at least the operating time.

The provision data calculating unit 103 calculates provision data that is data to be provided to a user, based on the number of output sheets and the number of reduced sheets that are the common data, and based on the conference information. In the first embodiment, the provision data calculating unit 103 calculates, as the provision data, data indicating a reduction effect due to use of a device, in particular, data concerning a sheet reduction effect. The report generating unit 102 generates a report that is report data based on the provision data.

Figure 6:
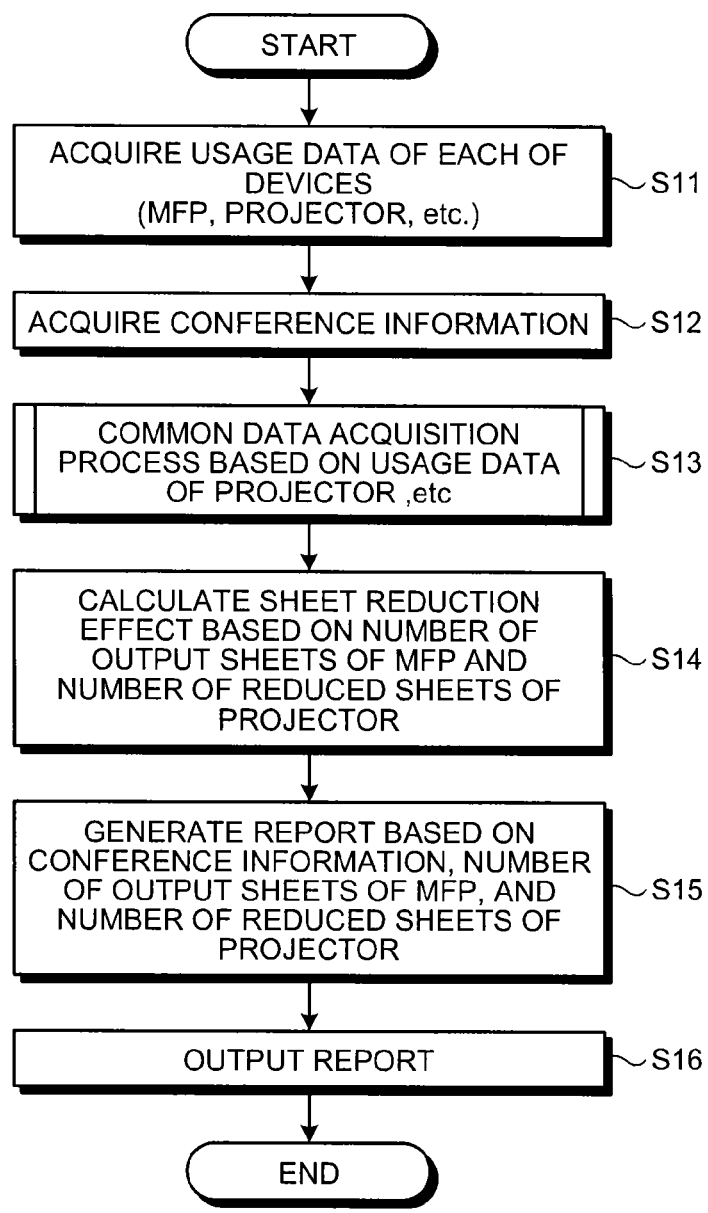
FIG. 6 is a flowchart illustrating the flow of a device management process according to the first embodiment.

A device management process according to the first embodiment configured as above will be explained below. FIG. 6 is a flowchart illustrating the flow of the device management process according to the first embodiment. The collecting unit 105 receives (acquires) and collects the usage data 152 from each of the devices including the MFP 200 and the projector 300 at predetermined times (Step S11).

The device management apparatus 100 displays the conference information input screen illustrated in FIG. 5 on the display unit 107, and the input unit 101 receives input of the conference information from a user to acquire the conference information (the duration per conference, the average number of participants in a conference, and the number of sheets per document) (Step S12). The common data acquiring unit 104 obtains common data from the usage data of the projector 300 or the like other than the MFP 200 (Step S13).

A common data acquisition process at Step S13 will be explained in detail below. FIG. 7 is a flowchart illustrating the flow of the common data acquisition process. In FIG. 7, a case will be explained that the number of output sheets (the number of reduced sheets) is used as the common data. Therefore, in FIG. 7, an example is explained in which the number of output sheets contained in the usage data 152a of the MFP 200 is obtained as it is as the common data and the number of output sheets (the number of reduced sheets) to be the common data is obtained from the operating time contained in the usage data 152b of the projector 300; however, the present invention is not limited thereto.

The common data acquiring unit 104 reads the usage data 152a of the MFP 200 from the storage device 150 and determines the number of output sheets contained in the usage data 152a as the common data (Step S31). The common data acquiring unit 104 then reads the usage data 152b of the projector 300 from the storage device 150 and calculates a total time spent for operations of the projector (a projector total time) from the usage data 152b (Step S32).

Specifically, when a report on the total of all departments is generated, the common data acquiring unit 104 acquires a value of the output sheets (calculated value) in the field of "sum total" from the usage data 152a of the MFP 200 and determines the acquired value as the common data. The common data acquiring unit 104 also acquires a total time in the item of "total" of "operating time" in the field of "sum total" from the usage data 152b of the projector 300 and determines the acquired total time as the projector total time. When a report on each department is generated, the common data acquiring unit 104 adds up the numbers of outputs (calculated value) in the item of "number of output sheets" in the usage data 152a of the MFP 200 for each department, and adds up times in the item of "total" of "operating time" in the usage data 152b of the projector 300 for each department to obtain the projector total time. When a report on each machine type is generated, the common data acquiring unit 104 adds up the numbers of outputs (calculated value) in the item of "number of output sheets" in the usage data 152a of the MFP 200 for each machine type, and adds up times in the item of "total" of "operating time" in the usage data 152b of the projector 300 for each machine type to obtain the projector total time.

The common data acquiring unit 104 calculates the number of conferences based on the duration per conference contained in the conference information acquired at Step S12 and based on the projector total time calculated at Step S32 (Step S33). Specifically, the common data acquiring unit 104 calculates the number of conferences according to Equation (1) below.

$$\text{The number of conferences} = \text{(the projector total time)} / \text{(the duration per conference)} \quad (1)$$

The common data acquiring unit 104 calculates the number of output sheets at one conference based on the average number of participants and the number of sheets per document contained in the conference information acquired at Step S12 (Step S34). Specifically, the common data acquiring unit 104 calculates the number of output sheets at one conference according to Equation (2) below.

The number of output sheets at one conference=(an average number of participants)×(the number of sheets per document) (2)

The common data acquiring unit 104 calculates the number of reduced sheets due to the projector and determines the calculated number as the common data (Step S35). Specifically, the common data acquiring unit 104 calculates the number of reduced sheets of the projector according to Equation (3) below.

The number of reduced sheets of the projector=(the number of conferences)×(the number of output sheets at one conference) (3)

Referring back to FIG. 6, when acquisition of the common data is completed as described above, the provision data calculating unit 103 calculates a sheet reduction effect based on the number of output sheets of the MFP 200 (determined at Step S31) and based on the number of reduced sheets of the projector 300 (calculated at Step S35), both of which are the common data (Step S14). Specifically, the provision data calculating unit 103 calculates, as the sheet reduction effect, a ratio (%) of the number of reduced sheets of the projector to the number of output sheets of the MFP 200.

The report generating unit 102 generates a report based on the conference information, the number of output sheets of the MFP 200, the number of reduced sheets of the projector, and the sheet reduction effect (Step S15), and outputs the generated report by displaying it on the display unit 107, transmitting it to the other devices via the network, or transmitting it to a predetermined email address (Step S16). For example, a report may be provided with a function to execute a calculation, such as a macro in a spreadsheet file. Specifically, it may be possible to allow the conference information to be input or modified in the output report such that when the conference information is updated, the calculations explained in FIG. 7 are executed by a calculation execution function, such as a macro, provided in the report in accordance with the updated conference information so that items, such as the sheet reduction effect, in the report can be updated with the calculated values. With this configuration, a user who has received the output report can input the conference information according to the actual conditions and can obtain information, such as the sheet reduction effect, according to the actual conditions.

FIG. 8 is a diagram for explaining an example of the conference information, the number of reduced sheets, and the sheet reduction effect. The number of reduced sheets and the sheet reduction effect illustrated in FIG. 8 are example calculation results obtained based on the usage data of the MFP 200 illustrated in FIG. 3 and the usage data of the projector 300 illustrated in FIG. 4 when the conference information with the values in the upper portion in FIG. 8 is input.

Figure 9:
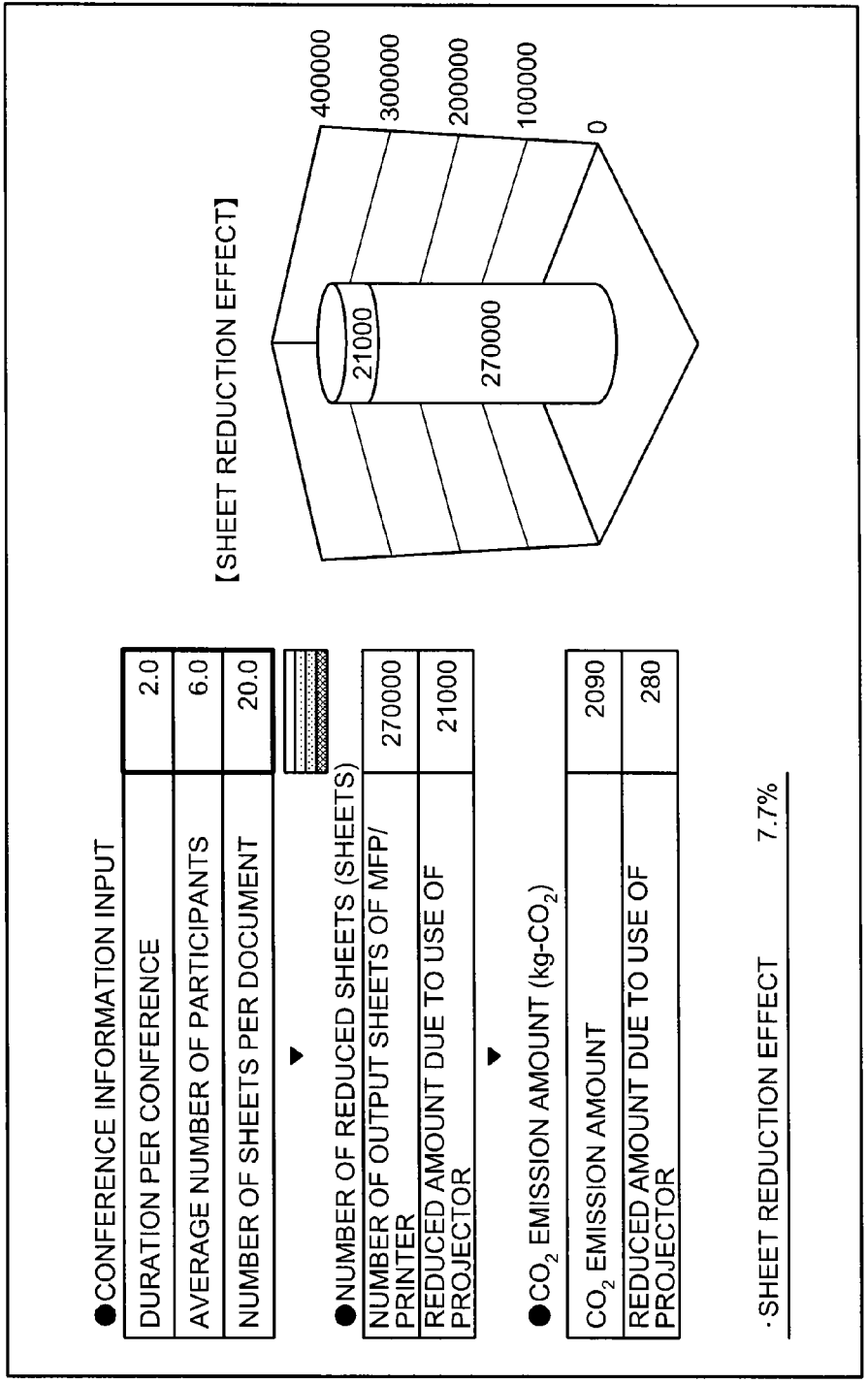
FIG. 9 is a diagram for explaining an example of a report according to the first embodiment.

FIG. 9 is a diagram for explaining an example of the report generated at Step S15. In FIG. 9, the calculation results illustrated in FIG. 8 are used, and information on the $CO_2$ emission amount and the $CO_2$ reduction amount are also recorded. That is, as illustrated in FIG. 9, it may be possible to obtain information on the $CO_2$ reduction amount as the reduction effect and include the information in the report.

As described above, according to the first embodiment, the usage data of each of the devices is converted into the common data that is common to all the devices, the provision data to be provided to a user is calculated based on the common data, and a report is generated and output based on the provision data. Therefore, it is possible to acquire the status of use from a plurality of devices and provide various services.

Second Embodiment

In the first embodiment, the MFP and the projector are used as the devices. However, in a second embodiment, a television (TV) conference terminal and a media board that are devices used via a network, such as cloud computing, are additionally used as the devices.

Figure 10:
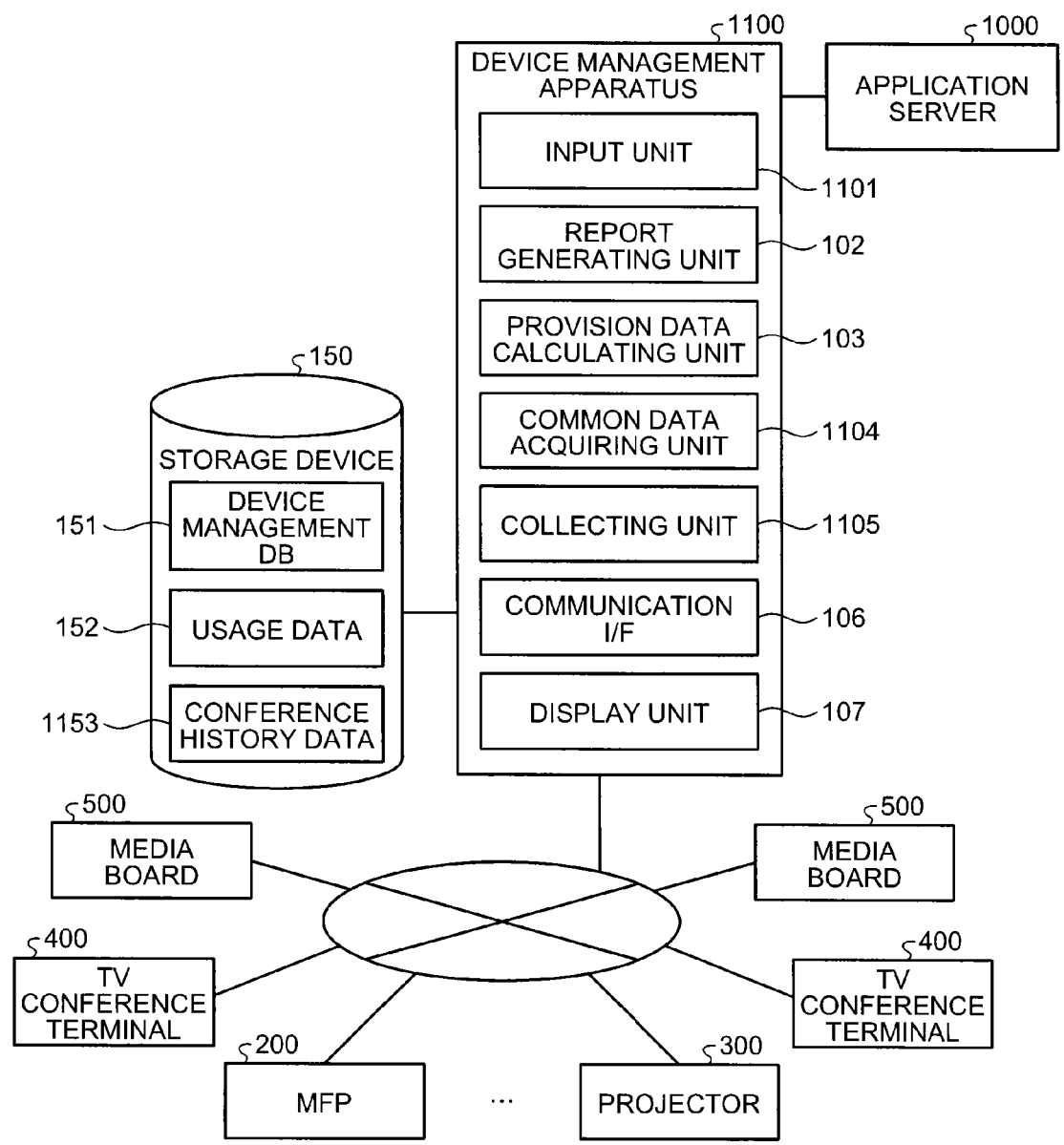
FIG. 10 is a block diagram illustrating a network configuration of a device management system and a functional configuration of a device management apparatus according to a second embodiment.

FIG. 10 is a block diagram illustrating a network configuration of a device management system and a functional configuration of a device management apparatus according to the second embodiment. As illustrated in FIG. 10, the device management system according to the second embodiment includes a plurality of devices, such as the MFP 200, the projector 300, TV conference terminals 400, media boards 500, and a device management apparatus 1100, all of which are connected to a network, such as the Internet or a LAN. In the second embodiment, the devices connected to the device management apparatus 1100 include devices of different types, such as the MFP 200 described above, the projector 300 described above, the TV conference terminals 400, and the media boards 500. The MFP 200 and the projector 300 are the same as those of the first embodiment.

The TV conference terminals 400 and the media boards 500 are network equipments that are used via a network, such as cloud computing. The TV conference terminals 400 are terminals for realizing a teleconference using video and audio with the TV conference terminals 400 at different locations via the network. The media boards 500 are devices for sharing information with other media boards 500 via the network. For example, a content written on any of the media boards 500 is also displayed on the other media boards 500 via the network. The TV conference terminals 400 and the media boards 500 are used for a conference with users of the TV conference terminals 400 and the media boards 500 at other locations.

In the second embodiment, the MFP 200, the projector 300, the TV conference terminals 400, and the media boards 500 are described as examples of the devices; however, the present invention is not limited thereto. For example, other image forming apparatuses or other information equipments (e.g., a personal computer or a mobile terminal, such as a smartphone) may be included as the devices.

Each of the devices including the MFP 200, the projector 300, the TV conference terminals 400, and the media boards 500 transmits usage data indicating a status of use of each of the devices to the device management apparatus 1100 at predetermined times, similarly to the first embodiment. Examples of the predetermined times include, but not limited to, times at regular intervals (e.g., for every day, for every week, or for every month), times when a request is received from the device management apparatus 1100, times when a power is turned on, times when a conference is held, and times when a predetermined operation is performed.

Each of the TV conference terminal 400 and the media board 500 generates conference history data as a history of conferences in which a user of each of the TV conference terminal 400 and the media board 500 has participated, and stores the conference history data in own storage unit. Each of the TV conference terminal 400 and the media board 500 adds data to the conference history data every time a conference is held, that is, every time the TV conference terminal 400 or the media board 500 is used. Each of the TV conference terminal 400 and the media board 500 transmits the conference history data to the device management apparatus 1100 at predetermined times. Examples of the predetermined times, at which the conference history data is transmitted, include, but not limited to, times at regular intervals (e.g., for every day, for every week, or for every month), times when a request is received from the device management apparatus 1100, times when a power is turned on, times when a conference is held, and times when a predetermined operation is performed.

An application server 1000 is connected to the device management apparatus 1100 via the network. The application server 1000 functions as a server for a TV conference performed by the TV conference terminals 400 and a server for data sharing between the media boards 500.

The device management apparatus 1100 is an information processing apparatus that manages a plurality of devices connected to the network. As illustrated in FIG. 10, the device management apparatus 1100 mainly includes an input unit 1101, the display unit 107, the report generating unit 102, the provision data calculating unit 103, a common data acquiring unit 1104, a collecting unit 1105, and the communication I/F 106. The functions of the display unit 107, the report generating unit 102, the provision data calculating unit 103, and the communication I/F 106 are the same as those of the first embodiment.

The device management apparatus 1100 is connected to the storage device 150 that is a storage medium, such as a HDD or a memory, similarly to the first embodiment. The storage device 150 may be configured as a part of the device management apparatus 1100 or may be configured as a device separate from the device management apparatus 1100. The storage device 150 stores therein the device management DB 151, the usage data 152, and conference history data 1153. The device management DB 151 and the usage data 152 of the MFP 200 and the projector 300 are the same as those of the first embodiment.

FIG. 11 illustrates an example of the usage data of the TV conference terminal 400 and the media board 500. And FIG. 11 is also segmentalized and each segment parts are placed up and down because of its wideness. As illustrated in FIG. 11, in the usage data 152 of the TV conference terminal 400 and the media board 500, items including a machine type name, a terminal ID, an installation department name, a subject month, a status of use of a device, a power consumption amount, a $CO_2$ emission amount, etc. are registered.

Referring back to FIG. 10, the storage device 150 of the second embodiment further stores therein the conference history data 1153. The conference history data 1153 is received from the TV conference terminal 400 and the media board 500.

FIG. 12 illustrates an example of the conference history data. As illustrated in FIG. 12, in the conference history data, items including a terminal ID as identification information, a terminal location, date and time of participation in and exit from a conference, a time spent for a conference, the number of participants, a location of other party of a conference, number of locations, a destination ID that is the ID of a terminal of the other party of a conference, etc. are registered.

Referring back to FIG. 10, the collecting unit 1105 has the same functions as those of the first embodiment, receives the above-described conference history data from each of the TV conference terminal 400 and the media board 500, and stores the received conference history data in the storage device 150.

The input unit 1101 receives input of the number of sheets per document that is the second data from a user via the conference information input screen. Specifically, in the second embodiment, the device management apparatus 1100 displays the conference information input screen on the display unit 107, causes the user to input the number of sheets per document via the conference information input screen, and causes the input unit 1101 to receive the input conference information.

FIG. 13 is a diagram for explaining an example of the conference information input screen according to the second embodiment. As illustrated in FIG. 13, the number of sheets per document can be input as the conference information via the conference information input screen. In the second embodiment, unlike in the first embodiment, the duration per conference and the average number of participants in a conference are not input via the conference information input screen. The duration per conference and the average number of participants in a conference are calculated from the conference history data by the common data acquiring unit 1104.

Referring back to FIG. 10, the common data acquiring unit 1104 obtains common data from the usage data, based on the duration per conference calculated by the common data acquiring unit 1104 and based on the operating time and the number of participants contained in the conference history data. In the second embodiment, the number of reduced sheets is used as the common data.

The common data acquiring unit 1104 of the second embodiment calculates the number of output sheets in the same manner as in the first embodiment. In this case, the common data acquiring unit 1104 obtains the duration per conference and the average number of participants from the contents of the conference history data and uses them for the calculation. Specifically, the common data acquiring unit 1104 calculates the duration per conference based on the operating time contained in the conference history data and obtains the average number of participants based on the number of participants contained in the conference history data. Thereafter, the common data acquiring unit 1104 calculates the number of reduced sheets in the same manner as in the first embodiment.

The common data acquiring unit 1104 can obtain not only the common data of one party of the conference but also the common data of the TV conference terminal 400 or the media board 500 of the other party of the conference by using the number of participants contained in the conference history data of the TV conference terminal 400 or the media board 500 of the other party. Namely, usage of the TV conference terminal 400 or the media board 500 of the other party of the conference at a location may be included in this embodiment. Whether the usage of the TV conference terminal 400 or the media board 500 of the other party of the conference at a location is included or not may be set in advance by a user through an input operation or the like.

FIGS. 14A and 14B are diagrams for explaining calculation of the common data of the destination TV conference terminal 400 or the media board 500 of the other party of a conference. When the usage of the TV conference terminal 400 or the media board 500 of the other party of the conference at a location is included, as illustrated in FIGS. 14A and 14B, the common data acquiring unit 1104 searches for records (two records denoted by 1301 and 1302), in each of which a terminal ID of one conference history data is registered as a destination ID in the other conference history data, from among records in the conference history data. Specifically, FIGS. 14A and 14B respectively illustrate the conference history data at two locations. A terminal ID of the record 1301 in FIG. 14A is the same as the destination ID of the record 1302 that is the other conference history data in FIG. 14B, and vice versa. That is, the records 1301 and 1302 are information on the same conference. Therefore, the common data acquiring unit 1104 calculates the common data of each of the parties of the conference by using the number of participants and the operating time registered in each of the records 1301 and 1302.

A device management process according to the second embodiment configured as above will be explained below. FIG. 15 is a flowchart illustrating the flow of the device management process according to the second embodiment. In FIG. 15, an example will be explained in which the number of output sheets (the number of reduced sheets) is obtained as the common data from the usage data of the TV conference terminal 400 or the media board 500; however, the present invention is not limited thereto.

The common data acquiring unit 1104 reads the usage data and the conference history data of the TV conference terminal 400 or the media board 500 from the storage device 150 (Step S51). The common data acquiring unit 1104 receives, as the conference information, the number of sheets per document from a user via the conference information input screen (Step S52).

The common data acquiring unit 1104 determines whether the usage of the TV conference terminal 400 or the media board 500 of the other party of the conference at a location is included or not in calculation of the common data, based on a setting or the like made by the user (Step S53).

When it is determined that the usage of the TV conference terminal 400 or the media board 500 of the other party of the conference at a location is included (YES at Step S53), the common data acquiring unit 1104 acquires conference history data of a corresponding terminal ID from the storage device 150 with reference to a destination ID recorded in a row in conference history data of one party, extracts a row (record) of the same conference from the acquired conference history data, and obtains the number of participants at a location of the other party (Step S54). The common data acquiring unit 1104 calculates the number of reduced sheets of the other party by using the number of participants contained in the conference history data of the other party (Step S55).

On the other hand, at Step S53, when it is determined that the usage of the TV conference terminal 400 or the media board 500 of the other party of the conference at a location is not included (NO at Step S53), the common data acquiring unit 1104 calculates the number of reduced sheets per conference by using the number of participants contained in the conference history data of one party (Step S56).

The common data acquiring unit 1104 calculates the number of reduced sheets per conference (Step S57). The processes from Step S53 to S57 are repeated for all the rows (records) within a predetermined period in the conference history data.

The common data acquiring unit 1104 calculates a total number of reduced sheets at the conferences within the predetermined period (Step S58).

The provision data calculating unit 103 calculates the sheet reduction effect based on the number of output sheets of the MFP 200 within the same period and based on the result value calculated in the above process (Step S59). The report generating unit 102 generates a report based on the conference information, the number of output sheets of the MFP 200, the number of reduced sheets of the TV conference terminal 400 or the media board 500, and the sheet reduction effect calculated in the above process (Step S60). The report generating unit 102 outputs the generated report to the display unit 107 (Step S61).

Figure 16:
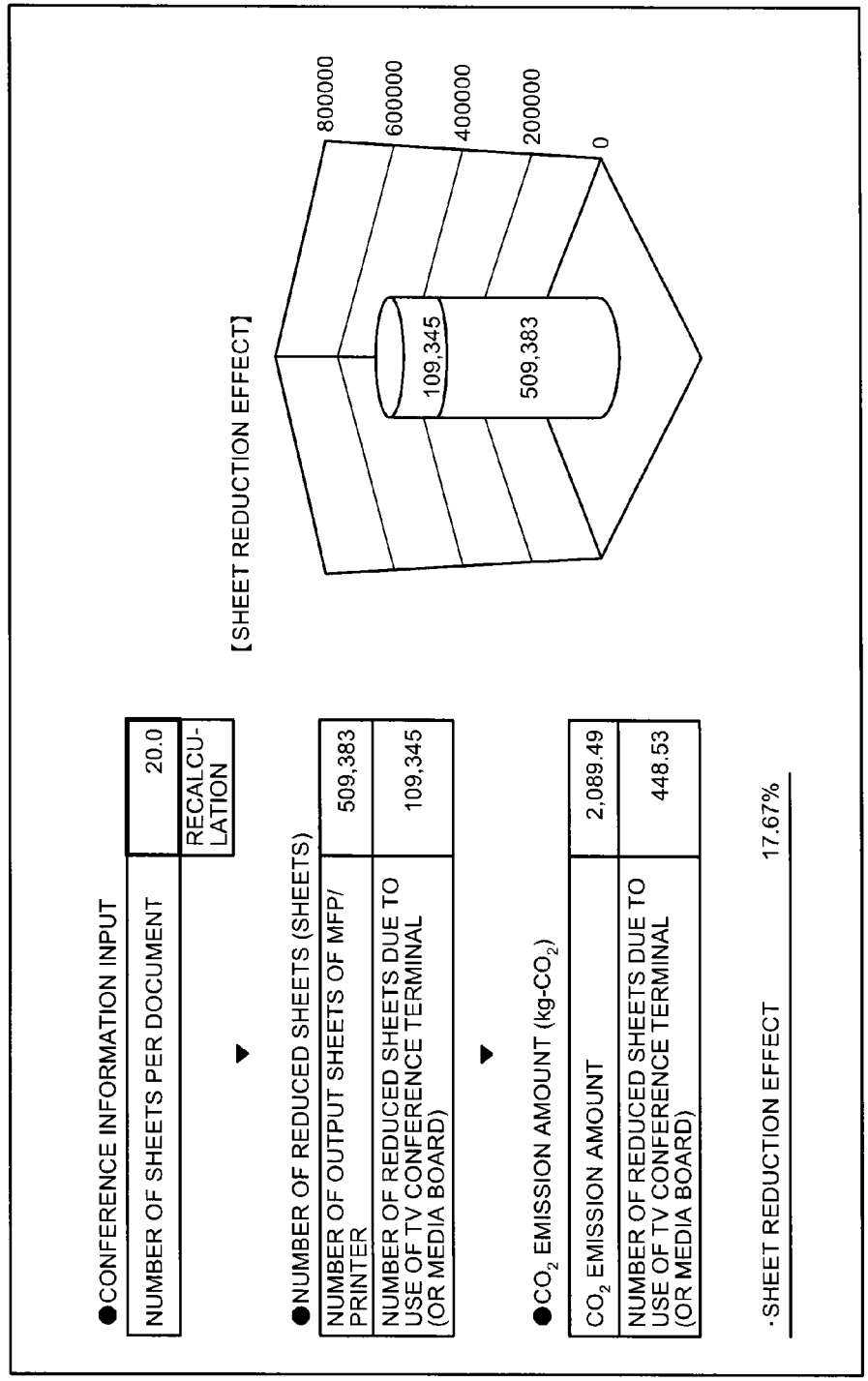
FIG. 16 is a diagram for explaining a display example of a generated report according to the second embodiment.

FIG. 16 is a diagram for explaining a display example of the generated report according to the second embodiment. In the display example in FIG. 16, the number of sheets per document is changeable based on input by a user. When the user inputs the number of sheets per document and presses a recalculation button on the display, the above process is executed again and the recalculated number of reduced sheets is displayed.

As described above, according to the second embodiment, the TV conference terminals 400 and the media boards 500 used via a network, such as cloud computing, are used as the devices, and the duration per conference and the average number of participants in the conference are obtained from the conference history data without having to receive them from a user. Therefore, it is possible to provide various services while reducing load on the user.

Furthermore, according to the second embodiment, the common data, such as the number of reduced sheets, of the other party of a conference is calculated. Therefore, it is possible to more effectively provide various services.

Third Embodiment

In a third embodiment, a cost reduction effect based on an operating time is calculated as the provision data from an inter-location cost for a conference, and the calculated effect is provided as a report.

A network configuration of a device management system and a functional configuration of the device management apparatus 1100 according to the third embodiment are the same as those of the second embodiment.

In the third embodiment, the device management apparatus 1100 stores, as inter-location cost data, a cost of travel between locations at which the conference is held by using the TV conference terminal 400 or the media board 500 in the storage device 150. FIG. 17 illustrates an example of the inter-location cost data. As indicated by the inter-location cost data in FIG. 17, the cost increases with an increase in the distance between the locations.

The provision data calculating unit 103 according to the third embodiment obtains a cost of travel between locations, each corresponding to different conference history data such that the terminal ID of one conference history data and a destination ID of the other conference history data are identical, on the basis of the above-mentioned inter-location cost data. The provision data calculating unit 103 then calculates, as the provision data, the cost reduction effect based on the obtained cost.

FIGS. 18A and 18B are diagrams for explaining calculation of the cost reduction effect according to the third embodiment. FIGS. 18A and 18B respectively illustrate the conference history data at two locations. A terminal ID of a record 1701 in FIG. 18A is the same as the destination ID of a record 1702 that is the other conference history data in FIG. 18B, and vice versa. That is, the records 1701 and 1702 are information on the same conference.

The provision data calculating unit 103 calculates, with reference to the conference history data, a cost needed when a predetermined number of participants at each location move to a destination location, for each conference in accordance with an inter-location cost table. The provision data calculating unit 103 then calculates a cost for each conference, and obtains a reduced cost per unit, such as per month.

For example, in the example in FIGS. 18A and 18B, the provision data calculating unit 103 calculates a cost according to Equation (4) below by referring to the inter-location cost data in the example in FIG. 17 based on the conference history data of the location in FIG. 18A.

$$\text{The number of participants (3)} \times \text{one-way cost (400 yen)} \times 2 = 2400 \text{ yen} \qquad (4)$$

The provision data calculating unit 103 calculates a cost according to Equation (5) below by referring to the inter-location cost data in the example in FIG. 17 based on the conference history data of the location illustrated in FIG. 18B.

$$\text{The number of participants (1)} \times \text{one-way cost (400 yen)} \times 2 = 800 \text{ yen} \quad (5)$$

The provision data calculating unit 103 compares results of Equations (4) and (5) and determines 800 yen, which is the calculation result of Equation (5) and which is cheaper, as the cost reduction effect.

Figure 19:
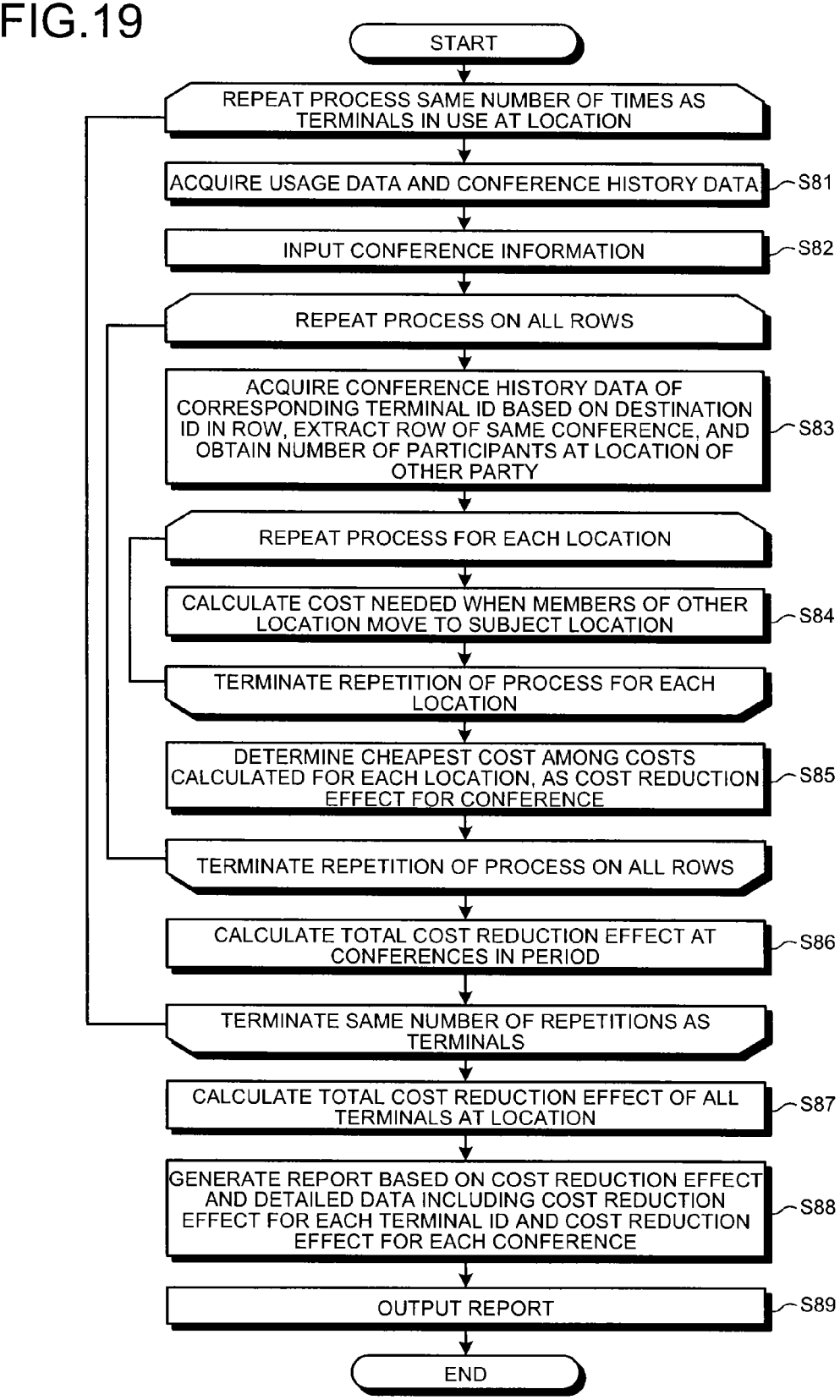
FIG. 19 is a flowchart illustrating the flow of a provision data calculation process according to the third embodiment.

A provision data calculation process performed by the device management apparatus 1100 according to the third embodiment configured as above will be explained below. FIG. 19 is a flowchart illustrating the flow of the provision data calculation process according to the third embodiment.

The provision data calculating unit 103 reads the usage data and the conference history data of the TV conference terminals 400 or the media boards 500 from the storage device 150 (Step S81). The provision data calculating unit 103 receives input of the number of sheets per document, as the conference information, from a user via the conference information input screen (Step S82).

The provision data calculating unit 103 acquires conference history data of a corresponding terminal ID from the storage device 150 with reference to a destination ID in a row in conference history data of one party, extracts a row of the same conference from the acquired conference history data, and obtains the number of participants at a location of the other party (Step S83). The provision data calculating unit 103 calculates a cost needed when members at the other location move to a subject location by referring to the inter-location cost data (Step S84). The cost calculation is repeated for each location.

The provision data calculating unit 103 determines, as the cost reduction effect for the conference, the cheapest cost among the costs calculated for each location (Step S85).

The processes from Step S83 to Step S85 are repeated for all the rows (records) within a predetermined period in the conference history data.

The provision data calculating unit 103 calculates a total cost reduction effects at the conferences within the predetermined period in the conference history data (Step S86).

The processes from Step S81 to Step S86 are repeated the same number of times as the number of terminals (the TV conference terminals 400 and the media boards 500) used at the location.

The provision data calculating unit 103 calculates a total cost reduction effect of all the terminals (the TV conference terminals 400 and the media boards 500) at the location (Step S87). The report generating unit 102 generates a report based on the cost reduction effect at the location and based on the cost reduction effect for each terminal ID and the cost reduction effect for each conference that are detailed data of the cost reduction effect (Step S88). The report generating unit 102 outputs the generated report to the display unit 107 (Step S89).

FIG. 20 is a diagram for explaining a display example of the generated report according to the third embodiment. As illustrated in the display example in FIG. 20, the cost reduction effect of a location and the cost reduction effect for each terminal ID and the cost reduction effect for each conference as detailed data are displayed.

As described above, according to the third embodiment, the cost reduction effect is obtained as the provision data from the conference history data and outputs it as a report. Therefore, it is possible to enhance the usability for a user.

Modification

In the above embodiments, the number of reduced sheets, which is an item of the usage data of the MFP 200, is calculated as the common data based on the usage data or the conference history data of a network-based equipments, such as the TV conference terminals 400 or the media boards 500.

Meanwhile, when the usage data or the conference history data of the network-based equipments, such as the TV conference terminals 400 or the media boards 500, and the usage data or the common data of the projector 300 are obtained, it is sufficient to compare the power consumption amounts or the $CO_2$ emission amounts as the common data as illustrated in FIGS. 21A and 21B. Each diagram of FIGS. 21A and 21B is segmentalized and each segment parts are placed up and down because of its wideness, and each FIGS. 21A and 21B need to be cross-referred for the above-mentioned comparison.

The device management apparatuses 100 and 1100 according to the first to the third embodiments include a control device, such as a central processing unit (CPU); a storage device, such as a read only memory (ROM) or a random access memory (RAM); an external storage device, such as a HDD or a compact disk (CD) drive; a display device, such as a display; and an input device, such as a keyboard or a mouse, and have a hardware configuration using a normal computer.

A device management program executed by the device management apparatuses 100 and 1100 according to the first to the third embodiments is provided by being recorded in a computer-readable recording medium, such as a CD-ROM, a flexible disk (FD), a compact disk recordable (CD-R), or a digital versatile disk (DVD), in a computer-installable or a computer-executable file format.

The device management program executed by the device management apparatuses 100 and 1100 according to the first to the third embodiments may be provided by being stored in a computer connected to a network, such as the Internet, so as to be downloaded via the network. The device management program executed by the device management apparatus 100 and 1100 according to the first to the third embodiments may be provided or distributed via a network, such as the Internet.

The device management program executed by the device management apparatuses 100 and 1100 according to the first to the third embodiments may be provided by being stored in a ROM or the like.

The device management program executed by the device management apparatuses 100 and 1100 according to the first to the third embodiments have a module structure including the above units (the input unit 101 or 1101, the report generating unit 102, the provision data calculating unit 103, the common data acquiring unit 104 or 1104, and the collecting unit 105 or 1105). As actual hardware, a CPU (processor) reads the device management program from the recording medium and executes it to load the above units on the main storage device, thereby generating the input unit 101 or 1101, the report generating unit 102, the provision data calculating unit 103, the common data acquiring unit 104 or 1104, and the collecting unit 105 or 1105 on the main storage device.

In the embodiments, the number of output sheets in the usage data 152*a* of the MFP 200 is used as the common data; however, this is by way of example only and the present invention is not limited thereto. For example, as long as data is made common to a plurality of devices, the data of other items may be used as the common data.

In the embodiments, data contained in the usage data 152*a* of the MFP 200 is used as the common data, and the operating time in the usage data 152*b* of the projector 300 or the usage data of the other devices is converted into the data contained in the usage data 152*a* of the MFP 200 to obtain the common data; however, it is not limited thereto. For example, the common data acquiring unit 104 may be configured to obtain common data by using, as common data, data that is not contained in any of the usage data of a plurality of devices, and convert the usage data of the devices into the data that is not contained in the usage data.

According to an embodiment of the present invention, it is possible to acquire the status of use from a plurality of devices and provide various services.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device management apparatus, comprising:
   a network interface to connect a first device and a second device; and
   a processor configured to
      receive, from the first device, first usage data indicating use of the first device, the first usage data including first specific data specific to the first device, the first specific data having a first format which indicates a number of output sheets,
      receive, from the second device, second usage data indicating use of the second device, the second usage data including second specific data specific to the second specific device, the second specific data having a second format which indicates an operating time,
      receive, from a user interface, one or more parameters to be used for conversion of the second specific data included in the second usage data which has been received to converted usage data, the converted usage data having the first format of the first specific data,
      convert the second specific data included in the received second usage data to the converted usage data in accordance with the one or more parameters for conversion which have been received, and
      generate report data based on the first specific data included in the received first usage data and the converted usage data, the converted usage data having been converted from the second specific data.

2. The device management apparatus claimed in claim 1, wherein the processor is further configured to output the generated report data.

3. The device management apparatus claimed in claim 2, wherein the processor outputs the generated report data by sending the generated report data to a destination.

4. The device management apparatus claimed in claim 2, wherein the processor outputs the generated report data by displaying the generated report data on a display device.

5. The device management apparatus claimed in claim 1, wherein the first device is a printing device and, the second device is a projector or a television conference terminal or a media board.

6. The device management apparatus of claim 1, further comprising:
   a storage device including memory for storing the first usage data and the second usage data.

7. A device management method, comprising:
   sending, to a device management apparatus from a first device, first usage data indicating use of the first device, the first usage data including first specific data specific to the first device, the first specific data having a first format which indicates a number of output sheets;
   sending, to the device management apparatus from a second device, second usage data indicating use of the second device, the second usage data including second specific data specific to the second specific device, the second specific data having a second format which indicates an operating time; and
   receiving report data from the device management apparatus, the report data have been generated by the device management apparatus based on the first specific data included in the first usage data sent from the first device and converted usage data, the converted usage data having the first format of the first specific data and being converted by the device management apparatus from the second specific data included in the second usage data sent from the second device in accordance with the one or more parameters for conversion which have been received from a user interface.

8. A device management system, comprising:
   a device management apparatus;
   a first device configured to send first usage data indicating use of the first device to the device management apparatus, the first usage data including first specific data specific to the first device, the first specific data having a first format which indicates a number of output sheets; and
   a second device configured to send second usage data indicating use of the second device to the device management apparatus, the second usage data including second specific data specific to the second device, the second specific data having a second format which indicates an operating time,
   wherein the device management apparatus includes:
      a network interface to connect the first device and the second device, and
      a processor configured to
         receive, from the first device, the first usage data,
         receive, from the second device, the second usage data,
         convert the second specific data included in the received second usage data to converted usage data in accordance with one or more parameters for conversion which have been received from a user interface, the converted usage data having the first format of the first specific data, and
         generate report data based on the first specific data included in the received first usage data and the converted usage data, the converted usage data have been converted from the second specific data.

9. The device management system claimed in claim 8, wherein the processor is further configured to output the generated report data.

10. The device management system claimed in claim 9, wherein the processor outputs the generated report data by sending the generated report data to a destination.

11. The device management system claimed in claim 9, wherein the processor outputs the generated report data by displaying the generated report data on a display device.

12. The device management system claimed in claim 8, wherein the first device is a printing device, the second device is a projector or a television conference terminal or a media board.

* * * * *